(12) United States Patent
Fukuda

(10) Patent No.: US 10,017,011 B2
(45) Date of Patent: Jul. 10, 2018

(54) STEEL CORD FOR REINFORCING RUBBER ARTICLE AND TIRE USING SAME

(71) Applicant: BRIDGESTONE CORPORATION, Chuo-ku, Tokyo (JP)

(72) Inventor: Yukimasa Fukuda, Kodaira (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 831 days.

(21) Appl. No.: 14/395,545

(22) PCT Filed: May 2, 2013

(86) PCT No.: PCT/JP2013/062777
§ 371 (c)(1),
(2) Date: Oct. 20, 2014

(87) PCT Pub. No.: WO2013/168678
PCT Pub. Date: Nov. 14, 2013

(65) Prior Publication Data
US 2015/0075689 A1    Mar. 19, 2015

(30) Foreign Application Priority Data

May 10, 2012   (JP) ................................. 2012-108868

(51) Int. Cl.
*B60C 9/00* (2006.01)
*D07B 1/06* (2006.01)
(Continued)

(52) U.S. Cl.
CPC ............. *B60C 9/0007* (2013.01); *D02G 3/48* (2013.01); *D07B 1/0613* (2013.01);
(Continued)

(58) Field of Classification Search
CPC ....... B60C 9/0007; D02G 3/48; D07B 1/0613
See application file for complete search history.

(56) References Cited

U.S. PATENT DOCUMENTS 6,863,103 B1     3/2005  Masubuchi et al.
2005/0211361 A1  9/2005  Nagahara et al.
(Continued)

FOREIGN PATENT DOCUMENTS

CN         1672962 A      9/2005
CN         1961113 A      5/2007
(Continued)

OTHER PUBLICATIONS

Communication dated Feb. 12, 2016, from the European Patent Office in counterpart European application No. 13786933.5.
(Continued)

*Primary Examiner* — Shaun R Hurley
(74) *Attorney, Agent, or Firm* — Sughrue Mion, PLLC

(57) ABSTRACT

Provided is a technique for attaining tire weight reduction while inhibiting occurrence of a product defect caused by deformation by improving the structure of a steel cord used for a carcass ply to improve the resistivity against deformation of a green tire when stored in an unvulcanized state. Also provided is a steel cord for reinforcing rubber articles with a multi-twisted structure in which a plurality of strands 11, 12 formed by twisting a plurality of wires 1, 2, 3 together in a layered-twisted structure are twisted together in a 2-layer-twisted structure. The cord mass is from 35 g/m to 65 g/m, and the ratio of flexural rigidity G (N·mm²) to cord cross section A (mm²), G/A (N) is from 400 N to 650 N.

10 Claims, 3 Drawing Sheets

(51) Int. Cl.
  *D02G 3/48* (2006.01)
  *B60C 9/04* (2006.01)

(52) U.S. Cl.
  CPC .............. *B60C 2009/0092* (2013.01); *B60C 2009/0425* (2013.01); *D07B 1/0626* (2013.01); *D07B 1/0633* (2013.01); *D07B 2201/2037* (2013.01); *D07B 2201/2097* (2013.01); *D07B 2501/2046* (2013.01)

(56) References Cited

U.S. PATENT DOCUMENTS

| | | | |
|---|---|---|---|
| 2008/0006844 A1 | 1/2008 | D'Evelyn et al. | |
| 2008/0283170 A1 | 11/2008 | Maruoka | |
| 2010/0005774 A1 | 1/2010 | Fukuda | |
| 2012/0043003 A1* | 2/2012 | Masubuchi | B60C 9/0007 152/556 |

FOREIGN PATENT DOCUMENTS

| | | |
|---|---|---|
| CN | 101306634 A | 11/2008 |
| CN | 101506433 A | 8/2009 |
| EP | 0488735 A1 | 6/1992 |
| EP | 0602733 A1 | 6/1994 |
| JP | 64-085382 A | 3/1989 |
| JP | 11-081170 A | 3/1999 |
| JP | 2006-021456 A | 1/2006 |
| JP | 2009-172793 A | 8/2009 |
| JP | 2011-001683 A | 1/2011 |
| JP | 2011-143859 A | 7/2011 |

OTHER PUBLICATIONS

Communication dated Nov. 30, 2015 from the State Intellectual Property Office of the P.R.C. in counterpart application No. 201380024503.6.

International Search Report for PCT/JP2013/062777, dated Jul. 9, 2013 (PCT ISA 210).

* cited by examiner

[Fig. 1]
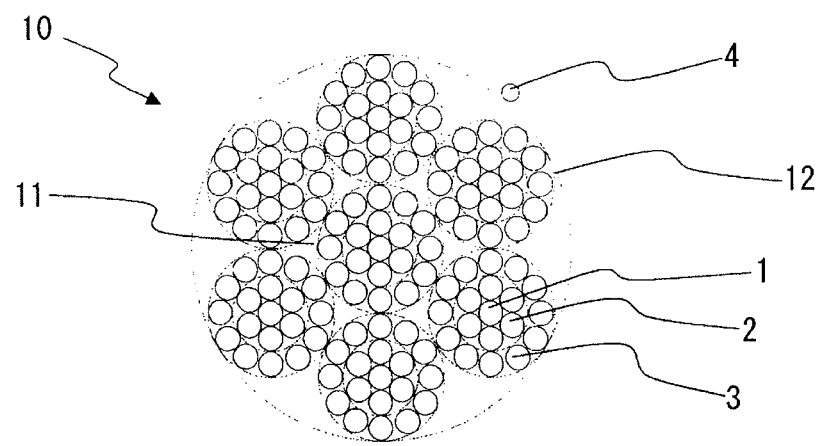
[Fig. 2]
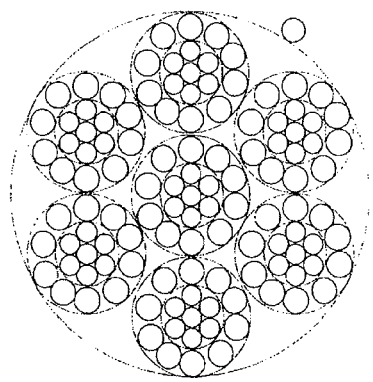
[Fig. 3]
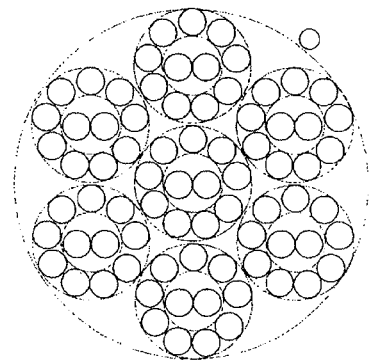

[Fig. 4]
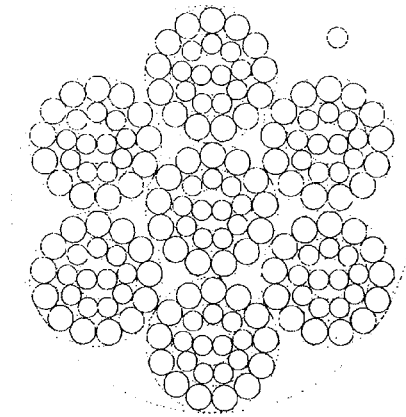
[Fig. 5]
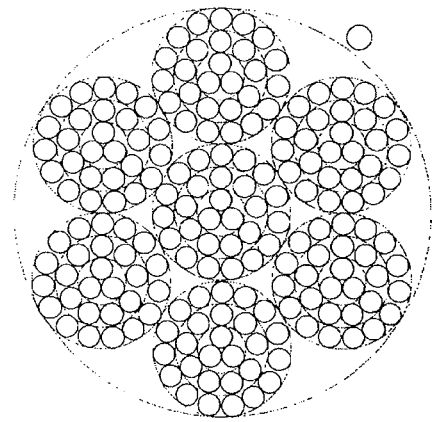
[Fig. 6]
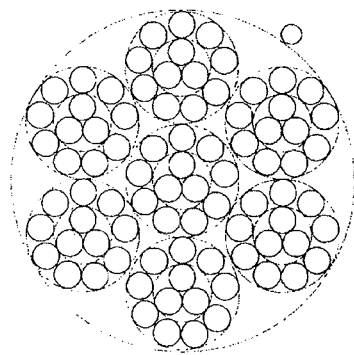

[Fig. 7]
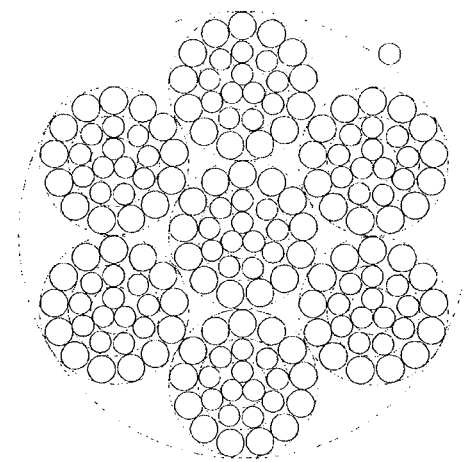
[Fig. 8]
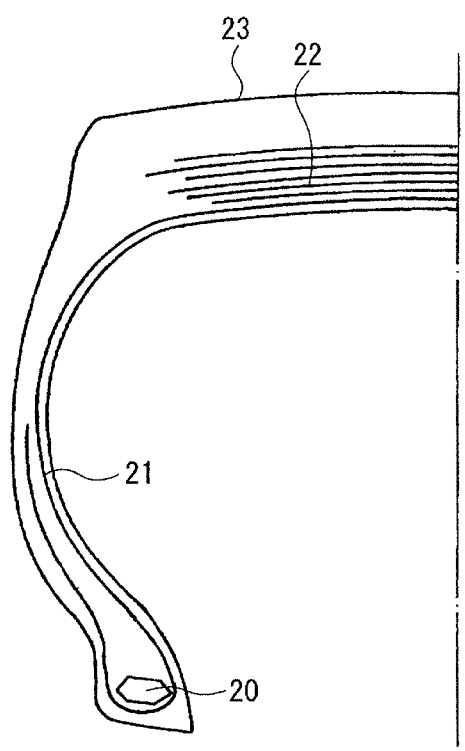

STEEL CORD FOR REINFORCING RUBBER ARTICLE AND TIRE USING SAME

TECHNICAL FIELD

The present invention relates to a steel cord for reinforcing rubber articles (hereinafter, also simply referred to as "cord") and a tire using the steel cord, and particularly to a steel cord for reinforcing rubber articles which is suitably used as a reinforcing material for rubber articles such as tires, in particular ultra-large off-the-road tires, and a tire using the steel cord.

BACKGROUND ART

In general, in a manufacturing process of a tire, a green tire before vulcanization (unvulcanized tire) needs to be temporarily stored. However, particularly when unvulcanized ultra-large radial (ORR, Off the Road Radial) tire is temporarily stored, a green tire is sometimes deformed due to its weight.

When the degree of deformation is large, a gap between a carcass ply material and a peripheral member is generated, which may cause a failure that a tire product as designed is not obtained. When a tire product which is not as designed is used under severe conditions, distortion is concentrated on a deformed portion of a carcass ply, which may be one of causes of separation failure. Such a tire therefore cannot be shipped as a product, which is a loss. On the other hand, in a recent resource-saving trend, weight reduction is needed also for carcass ply material. However, by simply reducing the amount of a carcass ply material to be used, such a deformation defect of a green tire is encouraged.

As a conventional art relating to a storing method for preventing deformation of a green tire, a technique relating to an apparatus for storing an unvulcanized tire, the apparatus comprising a bead supporting apparatus which supports an upper side bead portion of an unvulcanized tire which is mounted on a mount table and which prevents the upper side bead portion of an unvulcanized tire from being deformed due to its weight is disclosed (see patent document 1). In addition, Patent document 2 discloses a method of temporarily storing a large unvulcanized tire in a horizontal state whose shape is adjusted by a shaping mechanism, wherein a middle position between both bead portions and the center of a tread are maintained at the same height by supporting the shaping mechanism by a middle support attached to a midsection of a fixing frame from below as well as by supporting at least a lower shoulder portion of the large unvulcanized tire by an outside support surrounding the middle support from below and lifting the outside support by lifting means.

RELATED ART DOCUMENTS

Patent Documents

Patent Document 1: Japanese Unexamined Patent Application Publication No. 2009-172793.
Patent Document 2: Japanese Unexamined Patent Application Publication No. 2006-21456.

SUMMARY OF THE INVENTION

Problems to be Solved by the Invention

In order to secure high strength and durability also for a carcass ply in accordance with increased size of a tire, a multi-twisted structure is generally used for a steel cord as a carcass ply material. The term "multi-twisted structure" refers to a cord structure in which a plurality of strands formed by twisting a plurality of wires are further twisted together. In some cases, a wrapping wire is appropriately wound (wrapped) on the outermost of a multi-twisted cord.

On the other hand, from recent demand for resource-saving and weight reduction of a tire, there is a tendency that the diameter of a steel cord is reduced. Assuming a similar reduced structure when the diameter of a cord is reduced, a wire constituting a cord is thin. As a cord becomes thin, the flexural rigidity of the cord is reduced approximately in proportional to the wire diameter to the fourth power, rapidly resulting in a flexible cord.

In a manufacturing process of a tire, since rubber constituting a tire has fluidity particularly when the tire is in a state of a green tire before vulcanization, a stress is applied to a sidewall portion of the tire due to its weight even when such a mechanism as in Patent document 1 is employed to prevent falling of a bead when the tire is temporarily stored. When the diameter of a cord is reduced in such circumstances, deformation of the sidewall portion due to the weight of the tire has plasticity, whereby a failure that a product as designed is not obtained may occur. The larger the size of a tire, the larger the weight of a member constituting the tire; therefore, when an ultra-large tire has a rim diameter of 57 inches of larger, in particular, 63 inches or larger, the above-described problem is outstanding.

Accordingly, an object of the present invention is to provide a technique for attaining tire weight reduction while inhibiting occurrence of a product defect caused by deformation by improving the structure of a steel cord used for a carcass ply to improve the resistivity against deformation of a green tire when stored in an unvulcanized state.

Means for Solving the Problems

The present inventor intensively studied to discover that the above-described problems can be solved by using, as a steel cord to be used for a carcass ply, a cord which has a multi-twisted structure and satisfies predetermined ranges of a cord mass per unit length and the ratio of flexural rigidity G to cord cross section A, G/A, thereby completing the present invention.

In other words, a steel cord for reinforcing rubber articles of the present invention is a steel cord for reinforcing rubber articles with a multi-twisted structure in which a plurality of strands formed by twisting a plurality of wires together in a layered-twisted structure are twisted together in a 2-layer-twisted structure, wherein
a cord mass is from 35 g/m to 65 g/m, and the ratio of flexural rigidity G (N·mm$^2$) to cord cross section A (mm$^2$), G/A (N) is from 400 N to 650 N.

In the cord of the present invention, preferably, a wrapping wire is wound on the outside of the multi-twisted structure. Suitably, the diameter of the wire is from 0.205 mm to 0.285 mm. Further, the number of the wires constituting a cord is from 77 to 168. Still further, the strand preferably has 1+6+10, 1+6+12, 2+9 or 2+9+13 structure. Still further, the strand is preferably formed by twisting seven to nine wires together.

In the tire of the present invention, the above-described steel cord for reinforcing rubber articles is used as a reinforcing material of a carcass ply. The present invention is particularly suitable when applied to ultra-large off-the-road tires with a rim diameter of 57 inches or larger.

Effects of the Invention

According to the present invention, by employing the above-described constitution, a steel cord for reinforcing rubber articles in which the resistivity against deformation of a green tire when stored in an unvulcanized state can be improved can be attained. Therefore, according to the present invention, by using such a steel cord for reinforcing rubber articles, a tire whose weight is reduced while inhibiting occurrence of product defect caused by deformation can be attained, and in particular, a loss in manufacturing of a tire due to a defect caused by deformation of a green tire can be reduced even when the weight of a carcass ply is reduced in ultra-large off-the-road tires with a rim diameter of 57 inches or larger.

BRIEF DESCRIPTION OF THE DRAWINGS

FIG. 1 is a schematic cross-section illustrating a cross-sectional structure of a cord with a 7×(1+6+12)+1 structure used in Example 1, Example 2 and Example 3.

FIG. 2 is a schematic cross-section illustrating a cross-sectional structure of a cord with a 7×(1+6+10)+1 structure used in Example 4 and Example 5.

FIG. 3 is a schematic cross-section illustrating a cross-sectional structure of a cord with a 7×(2+9)+1 structure used in Example 6.

FIG. 4 is a schematic cross-section illustrating a cross-sectional structure of a cord with a 7×(2+9+13)+1 structure used in Example 7.

FIG. 5 is a schematic cross-section illustrating a cross-sectional structure of a cord with a 7×(3+9+15)+1 structure used in Comparative Example and Conventional Example 3.

FIG. 6 is a schematic cross-section illustrating a cross-sectional structure of a cord with a 7×(3+9)+1 structure used in Conventional Example 1 and Conventional Example 4.

FIG. 7 is a schematic cross-section illustrating a cross-sectional structure of a cord with a 7×(3+9+13)+1 structure used in Conventional Example 2.

FIG. 8 is a half sectional view in the tire width direction illustrating one example of a tire of the present invention.

MODE FOR CARRYING OUT THE INVENTION

In the following, embodiments of the present invention will be described with reference to the Drawings.

FIG. 1 is a schematic cross-section illustrating a cross-sectional structure of one example of steel cord for reinforcing rubber articles of the present invention. FIGS. 2 to 4 are a schematic cross-section illustrating a cross-sectional structure of another example of steel cord for reinforcing rubber articles of the present invention.

As illustrated, a steel cord for reinforcing rubber articles 10 of the present invention has a multi-twisted structure formed by twisting a plurality of strands each formed by twisting a plurality of wires together in a layered-twisted structure together in a 2-layer-twisted structure. The illustrated cord 10 has a multi-twisted structure in which a core strand 11 and a sheath strand 12 each with a 3-layer-twisted structure composed of a core wire 1, a first sheath wire 2, and a second sheath wire 3 are twisted together in a 2-layer-twisted structure, and a wrapping wire 4 is wound on the outside of the multi-twisted structure. Here, the wrapping wire 4 is not necessary in the cord of the present invention and can be optionally provided.

In the cord of the present invention, it is important that the cord mass per unit length is from 35 g/m to 65 g/m, and the ratio of flexural rigidity G (N·mm$^2$) to cord cross section A (mm$^2$), G/A (N) is from 400 N to 650 N. By setting the cord mass per a length of 1 m to a predetermined range to secure an amount of steel in a tire, it becomes possible, as one of basic functions of a tire, to support an internal pressure or a load particularly in a large tire and also in, among others, an ultra-large tire with a rim diameter of about 57 inches or larger. By securing a large flexural rigidity of a steel cord per unit cross section in the above-described range, the amount of deflection of a cord for a stress due to the weight of a green tire can be inhibited, thereby improving the resistivity against deformation of the green tire. Therefore, according to the present invention, even when the weight and the diameter of a cord are reduced, the resistivity against deformation of a green tire in a manufacturing process of a tire is improved and deformation of the green tire can be inhibited, thereby reducing a loss in tire manufacturing due to a defect caused by deformation of the green tire accompanied by the weight reduction of the tire.

When the cord mass is smaller than 35 g/m, it tends to be difficult particularly for an ultra-large tire with a rim diameter of 57 inches or larger to support the internal pressure or a load which is one of basic functions of a tire since the amount of steel is small. In order to enhance this function, the cord mass is more preferably 40 g/m or larger. On the other hand, when the cord mass is 65 g/m or larger, the cord diameter is large, and a lot of rubber is needed to coat the cord, which is uneconomical. In order to obtain a lighter tire, the cord mass is more preferably 55 g/m or smaller. In order to evaluate the cord mass per unit length of a steel cord in a rubber coated state which is taken out from a tire product, the weight of a steel cord left after rubber is removed with a medium with a desulfurizing effect such as nitrobenzene is measured and converted into a weight per unit length.

When the ratio of flexural rigidity G to cord cross section A, G/A is smaller than 400 N, the amount of deflection of the cord becomes large with respect to the stress due to the weight of a green tire, and the resistivity of deformation of a green tire becomes small. In order to enhance this effect, the ratio G/A is more preferably 500 N or higher. On the other hand, in cases in which the ratio G/A is larger than 650 N, when the cord is applied to a carcass ply material cord, a repulsion when the cord is wound around a bead portion becomes large; therefore, a defect that precision in tire manufacturing is deteriorated is likely to newly occur. In order to avoid this defect, the ratio G/A is more preferably 600 N or lower.

Here, in the present invention, the flexural rigidity G (N·mm$^2$) of a cord is calculated by $G=\Sigma_i n_{di} \times (E \times 9.8) \times I_{di} = \Sigma_i n_{di} \times 21000 \times 9.8 \times \pi d_i^4/64$ (N·mm$^2$), letting the diameter of a wire constituting the cord be $d_i$(mm), the number of the wires be $n_{di}$, the Young's modulus of wire material be E (kgf/mm$^2$) (in the case of steel; 21000 kgf/mm$^2$), and the geometrical moment of inertia be $I_{di}$(mm$^4$). When the cord includes a wrapping wire, the wrapping wire is included in the wires as one of the wires with a wire diameter of $d_i$. Letting the diameter of the cord excluding the wrapping wire be φ (mm), the cross section of the cord can be calculated by $A=\pi \times (\varphi/2)^2$ (mm$^2$).

A cord of the present invention satisfying the above-described conditions can be obtained by the combination of the cord structure and the wire diameter. In the present invention, specifically, by employing a simple structure in which the center of a wire of each layer constituting each strand in a multi-twisted cord is nearer to the center of the strand compared to a 3-twisted core structure and, on the other hand, by increasing the diameter of the wire, a cord satisfying conditions relating to the above-described cord mass and ratio G/A can be obtained. Specific examples of such a suitable strand structure include 1+6+10, 1+6+12, 2+9, and 2+9+13.

In the present invention, in a steel cord with the above-described multi-twisted structure, the diameter of a wire to be used, the cord diameter, the twist pitch, and the like are not particularly limited as long as conditions relating to the cord mass per unit length and the value of ratio G/A are satisfied, and can be appropriately selected as desired.

For example, in the present invention, the diameter of a wire constituting the cord can suitably be from 0.205 mm to 0.285 mm. The number of wires constituting the cord is suitably from 77 to 168. Further, in the cord of the present invention, the above described 7 to 9 strands are preferably twisted together.

In the tire of the present invention, the above-mentioned cord of the present invention is used as a reinforcing material of a carcass ply, whereby the resistivity against deformation when stored in an unvulcanized state is improved and weight reduction of a tire can be attained while inhibiting occurrence of a product defect caused by deformation. Specific examples of a tire of the present invention suitably include off-the-road tires illustrated in FIG. 8. The illustrated off-the-road tires comprises: a carcass 21 composed of steel cord ply extending in the radial direction between a pair of bead cores 20; at least two, in the illustrated example six belts 22 which are arranged outside the crown portion of the carcass 21 in the tire diameter direction; and a tread 23 which is arranged on the outside of the belt 22 in the tire diameter direction.

The tire of the present invention is not particularly restricted except that the above-described steel cord of the present invention is used as a reinforcing material, and can be appropriately constituted in accordance with a conventional method. The present invention is useful particularly when it is applied to ultra-large off-the-road tires with a rim diameter of 57 inches or larger, in particular, 63 inches or larger. Such ultra-large off-the-road tires normally comprise: one or more carcasses each composed of a steel cord ply extending in the radial direction between a pair of bead cores; at least four belt-crossing layers arranged on the outside of the crown portion in the tire diameter direction; and a tread arranged on the outside in the tire diameter direction.

Examples

In the following, the present invention will be described in more detail by way of Examples.

In accordance with conditions listed on the Table below, a composite sheet of a steel cord and unvulcanized rubber in a state in which the sheet was to be used in a tire were manufactured. The flexural rigidity and member weight of the sheet were measured and compared with one another. Specifically, since a green tire noticeably deforms when the flexural rigidity of a carcass ply which is a skeleton member of a tire is small, the flexural rigidity of a composite sheet was used as an index of the resistivity against deformation.

Specifically, the composite sheet was manufactured in the following manner. Steel cords were arranged in parallel on a plane with a space (cord interval W) corresponding to about 35% of the diameter $\varphi$ (mm) of a cord excepting a wrapping wire, and rubber sheets were pressed on the steel cords from above and below to manufacture a composite sheet as a simulated rubber coating material for a carcass ply which was coated such that the rubber thickness from the member surface to the cord surface excepting a wrapping wire was 2.5 mm. For such a composite sheet, the flexural rigidity and weight per unit width were measured and represented by indices setting those of Comparative Example to 100. The higher the value of the flexural rigidity, the higher the resistivity against deformation, which was preferred; the smaller the value of the weight, the lighter the sheet was, which was preferred. These results are listed on the Tables below in combination.

<Flexural Rigidity (Composite Sheet)>

The flexural rigidity of the composite sheet was evaluated by measuring the curve between push-in amount and push-in force when the composite sheet was supported with an interval of 100 mm and the middle point was pushed in by 15 mm in a three-point bending manner. Letting the push-in force in a pushing-in process be P(N) and the push-in amount be $\delta$ (mm), the slope $\Delta = dP/d\delta$ (N/mm) was obtained; letting the holding interval be L (mm), the flexural rigidity was measured by $G = (E \times 9.8) \times I = \Delta \times L^3/48$ (N·mm$^2$) (E: Young's modulus (kgf/mm$^2$), I: geometrical moment of inertia (mm$^4$)). The values were compared under conditions of $\delta = 10$ mm and L=100 mm.

TABLE 1

|  | Comparative Example | Conventional Example 1 | Conventional Example 2 | Conventional Example 3 |
| --- | --- | --- | --- | --- |
| Corresponding figure | FIG. 5 | FIG. 6 | FIG. 7 | FIG. 5 |
| Twisted structure | 7 × (3 + 9 + 15) + 1 | 7 × (3 + 9) + 1 | 7 × (3 + 9 + 13) + 1 | 7 × (3 + 9 + 15) + 1 |
| Wire diameter d (mm) | 0.23/0.23/0.23/0.25 | 0.225/0.225/0.21 | 0.19/0.19/0.23/0.25 | 0.24/0.24/0.24/0.25 |
| Flexural rigidity G (N · mm$^2$) | 5380 | 2190 | 3720 | 6370 |
| Cord diameter $\varphi$ (excepting wrapping wire) (mm) | 4.23 | 2.74 | 3.72 | 4.33 |
| Cord cross section A (mm$^2$) | 14.1 | 5.90 | 10.9 | 14.7 |
| G/A (N) | 383 | 372 | 342 | 433 |
| Cord mass (g/m) | 65.7 | 27.1 | 51.4 | 70.3 |
| Cord interval W (mm) | 1.5 | 1.0 | 1.3 | 1.5 |
| End count (/5 cm) | 8.8 | 13.5 | 10.0 | 8.6 |
| Flexural rigidity (composite sheet) (index) | 100 | 62.9 | 78.5 | 116 |
| Weight (composite sheet) (index) | 100 | 74.8 | 92.2 | 103 |

TABLE 2

| | Conventional Example 4 | Example 1 | Example 2 | Example 3 |
|---|---|---|---|---|
| Corresponding figure | FIG. 6 | FIG. 1 | FIG. 1 | FIG. 1 |
| Twisted structure | 7 × (3 + 9) + 1 | 7 × (1 + 6 + 12) + 1 | 7 × (1 + 6 + 12) + 1 | 7 × (1 + 6 + 12) + 1 |
| Wire diameter d (mm) | 0.36/0.36/0.21 | 0.24/0.24/0.24/0.25 | 0.25/0.25/0.25/0.25 | 0.265/0.265/0.265/0.25 |
| Flexural rigidity G (N · mm$^2$) | 14300 | 4500 | 5290 | 6670 |
| Cord diameter φ (excepting wrapping wire) (mm) | 4.45 | 3.55 | 3.75 | 3.95 |
| Cord cross section A (mm$^2$) | 15.6 | 9.88 | 11.0 | 12.2 |
| G/A (N) | 918 | 455 | 480 | 545 |
| Cord mass (g/m) | 69.4 | 48.6 | 53.1 | 59.0 |
| Cord interval W (mm) | 1.6 | 1.2 | 1.3 | 1.4 |
| End count (/5 cm) | 8.3 | 10.4 | 9.9 | 9.4 |
| Flexural rigidity (composite sheet) (index) | 252 | 99.6 | 111 | 133 |
| Weight (composite sheet) (index) | 101 | 91.4 | 93.6 | 97.2 |

TABLE 3

| | Example 4 | Example 5 | Example 6 | Example 7 |
|---|---|---|---|---|
| Corresponding figure | FIG. 2 | FIG. 2 | FIG. 3 | FIG. 4 |
| Twisted structure | 7 × (1 + 6 + 10) + 1 | 7 × (1 + 6 + 10) + 1 | 7 × (2 + 9) + 1 | 7 × (2 + 9 + 13) + 1 |
| Wire diameter d (mm) | 0.205/0.205/0.265/0.25 | 0.215/0.215/0.275/0.25 | 0.285/0.285/0.25 | 0.22/0.22/0.265/0.25 |
| Flexural rigidity G (N · mm$^2$) | 4400 | 5140 | 5170 | 6400 |
| Cord diameter φ (excepting wrapping wire) (mm) | 3.42 | 3.54 | 3.40 | 4.23 |
| Cord cross section A (mm$^2$) | 9.20 | 9.83 | 9.06 | 14.0 |
| G/A (N) | 478 | 523 | 571 | 456 |
| Cord mass (g/m) | 44.0 | 48.0 | 40.2 | 64.4 |
| Cord interval W (mm) | 1.2 | 1.2 | 1.2 | 1.5 |
| End count (/5 cm) | 10.8 | 10.5 | 10.9 | 8.8 |
| Flexural rigidity (composite sheet) (index) | 101 | 114 | 120 | 119 |
| Weight (composite sheet) (index) | 87.8 | 90.8 | 83.8 | 98.9 |

As shown in the above Table, in each Conventional Example, it was found that, compared with Comparative Example, weight reduction was not attained while maintaining the flexural rigidity. In contrast, in each Example, it was confirmed that weight reduction was attained while retaining the flexural rigidity.

DESCRIPTION OF SYMBOLS

1 Core wire
2 First sheath wire
3 Second sheath wire
4 Wrapping wire
11 Core strand
12 Sheath strand
10 Steel cord for reinforcing rubber articles
20 Bead core
21 Carcass
22 Belt
23 Tread

The invention claimed is:

1. A steel cord for reinforcing rubber articles with a multi-twisted structure in which a plurality of strands formed by twisting a plurality of wires together in a layered-twisted structure are twisted together in a 2-layer-twisted structure, wherein
a cord mass per length is from 35 g/m to 65 g/m, and the ratio of flexural rigidity G (N•mm$^2$) to cord cross section A (mm$^2$), G/A (N) is from 400 N to 650 N, and wherein a strand among the plurality of strands has a 1+6+10, 1+6+12, 2+9, or 2+9+13 structure.

2. The steel cord for reinforcing rubber articles according to claim 1, wherein a wrapping wire is wound on the outside of the multi-twisted structure.

3. The steel cord for reinforcing rubber articles according to claim 1, wherein the diameter of each wire of the plurality of wires is from 0.205 mm to 0.285 mm.

4. The steel cord for reinforcing rubber articles according to claim 1, wherein a number of the wires constituting the steel cord is from 77 to 168.

5. The steel cord for reinforcing rubber articles according to claim 1, wherein the steel cord is formed by twisting seven to nine strands together.

6. The steel cord for reinforcing rubber articles according to claim 1, wherein each strand among the plurality of strands has a 1+6+10, 1+6+12, 2+9, or 2+9+13 structure.

7. A steel cord for reinforcing rubber articles with a multi-twisted structure in which a plurality of strands formed by twisting a plurality of wires together in a layered-twisted structure are twisted together in a 2-layer-twisted structure, wherein
 a cord mass per length is from 35 g/m to 65 g/m, and the ratio of flexural rigidity G (N•mm$^2$) to cord cross section A (mm$^2$), G/A (N) is from 400 N to 650 N, and
 wherein each strand among the plurality of strands has a 1+6+10 or 1+6+12 structure.

8. A steel cord for reinforcing rubber articles with a multi-twisted structure in which a plurality of strands formed by twisting a plurality of wires together in a layered-twisted structure are twisted together in a 2-layer-twisted structure, wherein
 a cord mass per length is from 35 g/m to 65 g/m, and the ratio of flexural rigidity G (N•mm$^2$) to cord cross section A (mm$^2$), G/A (N) is from 400 N to 650 N, and
 wherein each strand among the plurality of strands has a 2+9 or 2+9+13 structure.

9. A tire wherein the steel cord for reinforcing rubber articles according to claim 1 is used as a reinforcing material of a carcass ply.

10. The tire according to claim 9 which is an ultra-large off-the-road tire with a rim diameter of 57 inches or larger.

* * * * *